United States Patent Office 3,429,865
Patented Feb. 25, 1969

3,429,865
CHLORINATED POLYETHYLENE COMPOSITIONS
Joseph J. Baron, Jr., Morris Plains, and Albert A. Kveglis, Clifton, N.J., assignors, by mesne assignments, to The Dow Chemical Company, Midland, Mich., a corporation of Delaware
No Drawing. Filed Mar. 23, 1965, Ser. No. 442,164
U.S. Cl. 260—94.9     6 Claims
Int. Cl. C08f 27/03, 45/36

ABSTRACT OF THE DISCLOSURE

More particularly, the invention relates to chlorination of ethylene polymers in aqueous slurry with elemental chlorine in the presence of a member selected from the group consisting of a fatty acid containing 16–18 carbon atoms which acid is generated in situ in the aqueous slurry by the action of hydrochloric acid on a metallic salt of such acid and an alkylphenyl polyethylene glycol ether containing 4–20 ethylene groups where the alkyl group contains 6–18 carbon atoms; whereby agglomeration of the polymer is avoided and chlorination rates are substantially improved while also enabling the production of chlorinated polyethylene products having significantly improved free-flowing and handling properties.

---

This application relates to improved chlorinated polyethylene compositions and process for making the same.

In the chlorination of polyethylenes a serious drawback is the agglomeration of the resin in the liquid medium preventing uniform and homogeneous chlorination of the polymer. The necessity to avoid agglomeration requires the use of careful and slow chlorination rates. Even after chlorination is completed, the final product is not sufficiently free-flowing and tends to stick together.

In accordance with the process of the present invention there is added to an aqueous slurry of a polyethylene at least one saturated soap containing 16–18 carbon atoms or an alkylphenyl polyethylene glycol ether containing 4–20 ethylene groups and wherein the alkyl group contains 6–18 carbon atoms, and subsequently the slurry is chlorinated to a desirable chlorine content.

The process of the present invention is applicable to all types of polyethylenes known to be chlorinatable by a slurry chlorination process, including reduced molecular weight polyethylenes prepared in accordance with British Patent No. 858,674. Aqueous slurry chlorination processes are well-known, and the process of the present invention is particularly applicable to the chlorination process described in Italian Patent No. 663,186, or British Patent No. 950,374.

Particularly suitable $C_{16}$–$C_{18}$ saturated soaps include the sodium salts of stearic or palmitic acid, from which the corresponding acid can be made in situ, in the chlorination reactor wherein the acid precipitates out onto the polymer particles during chlorination and coats them with a very thin layer. The hydrochloric acid formed during the chlorination will form the acid from the stearate or palmitate according to the following equation written for the stearate:

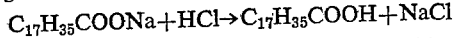
$$C_{17}H_{35}COONa + HCl \rightarrow C_{17}H_{35}COOH + NaCl$$

The stearic acid which is thus formed is then chlorinated along with the polyethylene. The chlorinated acid which adheres to the surface of the chlorinated resin makes the resin free-flowing and imbued with good handling characteristics.

Outside of ionic surfactants, such as the above-mentioned saturated soaps, also nonionic surfactants can be advantageously used in accordance with the invention. Preferred compounds of this type include alkylphenol condensation products wherein the alkyl group contains 6–18 carbon atoms, with 4–20 mols ethylene oxide. Nonylphenylethylene glycol ethers which belong to this group are sold e.g. under the trademark Tergitol.

The following are some examples given to illustrate the best mode contemplated for carrying out the invention, which is not limited, however, to all details of the examples. The results of some chlorinated products prepared in accordance with the invention were compared with conventional chlorinated products and compared for free-flowing characteristics by means of a test wherein the chlorinated product was placed into a 150 ml. beaker, a steel rod having a 2″ diameter and a length to create a pressure of 1.7 p.s.i. was lowered onto the surface of the chlorinated polyethylene product in the beaker and allowed to press upon it for a period of 24 hours at room temperature. After this period the product was removed from the beaker, and depending on the crumbling characteristics of the chlorinated polyethylene cake, ratings were assigned to it ranging on an arbitrary scale from 1 to 5. The chlorinated polyethylene cake having a free-flow rating of 1 immediately crumbled upon removal from the beaker, while a material having a rating of 5 does not crumble and is in an agglomerated state.

While the concentration of the surfactant is not critical, use of 0.1–1% by weight of the soap, and as little as 0.065 to 0.25% by weight of the ether, based on polyethylene, were found to give excellent results. The temperature is not critical, and the temperatures preferred for slurry chlorination of polyethylene can be advantageously used.

EXAMPLE I

A slurry was prepared of 6 parts polyethylene having a viscosity average molecular weight of 1,100,000 and 54 parts by weight deionized water. 0.5% by weight of a sodium stearate-palmitate soap, sold under the trademark Ivory, based on the weight of dry polyethylene was dissolved in water, the solution having a pH of 7. The soap solution was added to the slurry which was then heated to 95–100° C. under nitrogen. Considerable amounts of foam formed, but this did not create particular problems. After the purge, chlorination was carried out between 100–140° C. with a chlorination rate of 0.1 lb. $Cl_2$/lbs. polyethylene/hour at 100° C. until 5% by weight chlorine, based on polyethylene, was combined with the resin. Thereafter, until 10% by weight chlorine was incorporated into the resin, the chlorination rate was 0.2 lb. $Cl_2$/lb. polyethylene/hour at 100° C.; then until 23% chlorine was combined, the rate was 0.45 at a temperature rising gradually to 140° C.; and the chlorination rate was 0.5 at 140° C. until a total of 40% chlorine was combined with the resin. When the chlorination was completed the acid was drained, the polymer was washed seven times each with about 5 gallons cold water; subsequently the polymer was filtered, centrifuged and dried.

Polyethylene thus prepared had a free-flow rating of 1, compared to a free-flow rating of 5 for a chlorinated polyethylene prepared in a similar manner, except without the soap.

EXAMPLE II 1000 parts by weight deionized water, 1.5 parts by weight 37.5% by weight hydrochloric acid solution, 0.5 part by weight Ivory soap flakes, 100 parts by weight of polyethylene of Example I were slurried and treated and chlorinated as described in Example I. No agglomeration occurred during chlorination, and the recovered product was free-flowing and possessed no tendency to agglomerate.

A small amount of hydrochloric acid added to the original slurry alleviated the foaming problem observed in carrying out the processes of Example I, and also enabled the use of the reactor not suited for contact with alkaline medium.

EXAMPLE III 1100 parts by weight deionized water, 0.065 part by weight of a 60 p.p.m. surfactant-containing aqueous solution and 100 parts by weight of polyethylene of Example I were slurried. The surfactant was a nonylphenylethylene glycol prepared by condensing 1 mol nonylphenol with 10.5 mols ethylene oxide, sold under the trademark Terigtol NPX. Nitrogen purge and chlorination was conducted as in Example I, and similarly improved chlorinated product was obtained.

We claim:

1. In a process for chlorinating polyethylene in an aqueous slurry, the improvement which comprises adding to the aqueous chlorination medium a member selected from the group consisting of a fatty acid containing 16–18 carbon atoms which acid is generated in situ in said aqueous slurry by the action of hydrochloric acid on a metallic salt of said acid and an alkylphenyl polyethylene glycol containing 4–20 ethylene groups where the alkyl group contains 6–18 carbon atoms, and subsequently contacting the slurry with chlorine at elevated temperatures.

2. The improvement of the process of claim 1, wherein said fatty acid is substantially a mixture of stearic acid and palmitic acid.

3. The improvement of the process of claim 1, wherein said ether is a nonylphenylethylene glycol ether prepared by condensing 4–20 mols ethylene oxide per mol of nonylphenol.

4. The improvement of the process of claim 1, wherein the concentration of said fatty acid is 0.1–1% by weight and of said ether is 0.065–0.25% by weight, based on polyethylene.

5. A composition comprising a chlorinated polyethylene and a chlorinated fatty acid having 16–18 carbon atoms.

6. A composition comprising a chlorinated polyethylene and a water-insoluble chlorinated residue of an alkylphenyl polyethylene glycol ether containing 4–20 ethylene groups wherein the alkyl group contains 6–18 carbon atoms.

References Cited

UNITED STATES PATENTS 3,005,812 10/1961 Wohlers.
3,311,579 3/1967 Donat.

JOSEPH L. SCHOFER, *Primary Examiner.*

L. EDELMAN, *Assistant Examiner.*

U.S. Cl. X.R.

260—29.6, 31.8, 33.2